United States Patent
Marchionni et al.

(10) Patent No.: US 6,869,920 B2
(45) Date of Patent: Mar. 22, 2005

(54) USE OF FLUORINATED LIQUIDS FOR THE HEAT EXCHANGE OR AS WORKING FLUIDS IN THE PRESENCE OF IONIZING RADIATIONS AND/OR IRRADIATION WITH NEUTRONS

(75) Inventors: Giuseppe Marchionni, Milan (IT); Pier Antonio Guarda, Milan (IT)

(73) Assignee: Solvay Solexis S.p.A., Milan (IT)

( * ) Notice: Subject to any disclaimer, the term of this patent is extended or adjusted under 35 U.S.C. 154(b) by 172 days.

(21) Appl. No.: 10/274,107

(22) Filed: Oct. 21, 2002

(65) Prior Publication Data

US 2003/0130143 A1 Jul. 10, 2003

(30) Foreign Application Priority Data

Oct. 23, 2001 (IT) ..................................... MI2001A2210
Jul. 23, 2002 (IT) ..................................... MI2002A1623

(51) Int. Cl.$^7$ ................... C01M 131/04; C01M 131/10
(52) U.S. Cl. ...................................... 508/582; 508/590
(58) Field of Search .................................. 508/582, 590

(56) References Cited

U.S. PATENT DOCUMENTS

| | | | |
|---|---|---|---|
| 4,675,452 A | * 6/1987 | Lagow et al. ................ | 568/601 |
| 4,845,268 A | * 7/1989 | Ohsaka et al. .............. | 560/184 |
| 4,898,991 A | * 2/1990 | Huang ........................ | 568/615 |
| 4,960,951 A | * 10/1990 | Nappa et al. ................ | 568/615 |
| 4,996,369 A | * 2/1991 | Kalota et al. ............... | 568/615 |
| 5,000,830 A | 3/1991 | Marchionni et al. | |
| 5,120,459 A | * 6/1992 | Kalota et al. ............... | 508/582 |
| 5,124,058 A | * 6/1992 | Corti et al. ................. | 508/509 |
| 5,144,092 A | 9/1992 | Marraccini et al. | |
| 5,149,842 A | 9/1992 | Sianesi et al. | |
| 5,154,845 A | * 10/1992 | Williams .................... | 508/545 |
| 5,220,082 A | 6/1993 | Krespan | |
| 5,498,359 A | * 3/1996 | Shinomoto et al. ......... | 508/207 |
| 5,713,211 A | 2/1998 | Sherwood | |

FOREIGN PATENT DOCUMENTS

EP  0 695 775 B1  12/1998
EP  0 982 281 A1  3/2000

* cited by examiner

*Primary Examiner*—Ellen M. McAvoy
(74) *Attorney, Agent, or Firm*—Arent Fox

(57) ABSTRACT

Use as heat exchange or hydraulic liquids in circuits or equipments subjected to ionizing radiations and/or irradiation with neutrons, of fluorinated liquids selected from the group formed by:

A) (per)fluoropolyethers,
B) (per)fluorocarbons,
C) hydrofluoroethers, appearing liquid under room conditions (25° C., 1 atm).

10 Claims, No Drawings

USE OF FLUORINATED LIQUIDS FOR THE HEAT EXCHANGE OR AS WORKING FLUIDS IN THE PRESENCE OF IONIZING RADIATIONS AND/OR IRRADIATION WITH NEUTRONS

The present invention relates to the use of fluorinated compounds as heat exchange fluids or working fluids in circuits or equipments subjected to ionizing radiations and/or irradiation with neutrons.

More specifically the present invention relates to the use of perfluoropolyethers, hydrofluoropolyethers, hydrofluoroethers, hydrofluorocarbons and perfluorocarbons as cooling liquids resistant to ionizing radiations and as hydraulic fluids having a moderation index of irradiation with neutrons lower than that of hydrogenated hydraulic fluids.

It is known that the equipments wherein high energy fields are generated, such as for example particle accelerators as cyclotron, wherein ionizing radiations, for example X rays, gamma rays, electrons, are present, require, to disperse the generated heat, cooling liquids which act by heat exchange which must also resist ionizing radiations.

For example, in cyclotrons, for the aforesaid purpose, chlorofluorocarbon CFC 113 is used as cooling fluid both for its heat exchange capability and for its high stability under ionizing radiations.

However following on the Montreal Conference chlorofluorocarbons, as CFC 113, have been banned due to their high impact on the ozone (ODP).

Equipments for the handling of fissile compound and/or radioactive wastes are also known. The hydraulic fluids usually employed in the equipments cannot be used in said field since they are formed by mineral oils. Since mineral oils contain hydrogen can have a high moderation effect on neutrons. Said moderation effect produces slower neutrons which in the presence of fissile compound or radioactive wastes can cause therein an uncontrollable chain nuclear reaction with remarkable risks for the plant itself, for the personnel and for the environment.

Furthermore the compound used in said circuits has not to become radioactive (induced radioactivity) when subjected to neutronic beams.

Another characteristic required to the used fluids is that they do not undergo a substantial chemical degradation because of neutrons or ionizing radiations.

The need was therefore felt to find heat exchange or working fluids not showing the drawbacks of the fluids at present used when subjected to ionizing radiations and/or irradiation with neutrons.

In particular heat exchange fluids having Ozone Depletion Potential (ODP) equal to zero were required, having features and properties substantially similar to those of CFC 113, i.e. showing degradation values to ionizing radiations similar to those of CFC 113, to be used, in its replacement, as drop-in, in the presence of ionizing radiations.

Besides, hydraulic fluids not having neutron moderation effect, not showing induced radioactivity phenomena and not undergoing a substantial degradation when subjected to neutronic irradiation, were required.

Fluids as defined below capable to solve the above technical problem have been unexpectedly and surprisingly found.

An object of the present invention is the use as heat exchange or hydraulic fluids in circuits or equipments subjected to ionizing radiations and/or irradiation with neutrons, of fluorinated compounds selected from:

A) (per)fluoropolyethers,
B) (per)fluorocarbons,
C) hydrofluoroethers, appearing liquid under room conditions (25° C., 1 atm).

The fluids have molecular weights comprised between 120 and 30,000, preferably between 200 and 18,000, more preferably between 300 and 6,000. When A) is a polymer the molecular weight is a number average molecular weight.

The class A) (per)fluoropolyethers comprise oxyfluoroalkylene units selected from $-(CF_2(CF_2)_cO)-$ wherein c=1, 2, 3; $-(CF_2O)-$; $-(CF_2CF(CF_3)O)-$; $-(CF(CF_3)O)-$; $-(CF_2CF(OX))-$; $-(CF(OX)O)-$ wherein $X=-(Y)_nCF_3$ wherein $Y=-CF_2-$, $-CF_2O-$, $-CF_2CF_2O-$, $-CF_2CF(CF_3)O-$, and n=0, 1, 2, 3, 4; said units being statistically distributed in the polymer chain. Preferably they have the following formula (I):

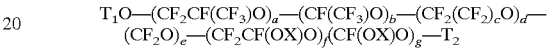

wherein X has the above meaning; the coefficients a, b, d, e, f, g are 0 or integers, c is 1, 2 or 3, selected so that their sum is such to obtain the above molecular weights; T1, $T_2$ equal to or different from each other, are selected from $-CF_2H$, $-CF_2X_1$ ($X_1=-F$, $-CF_3$,), $-C_3F_7$, $-CF(CF_3)H$, $-CF_2CF_2H$, $-CH_3$, $-C_2H_5$.

The preferred compounds as heat exchangers of formula (I) are those wherein $T_1$ and $T_2$, equal to or different from each other, are selected from $-CF_2H$, $-CF(CF_3)H$, $-CF_2CF_2H$, $-CH_3$, $-C_2H_5$. These terminal ends show a low potential greenhouse effect (GWP). The compounds more preferred have the formula (III):

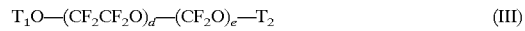   (III)

wherein $T_1$, $T_2=-CF_2H$ and d, e are as defined in formula (I).

Among the perfluoropolyethers of formula (I) having perfluorinated end groups those having formula (II) are preferred as heat exchangers or working fluids:

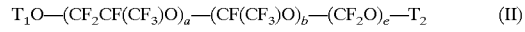   (II)

wherein $T_1$, $T_2$ equal to or different from each other, are selected from $-CF_2X_1$ ($X_1=-F$, $-CF_3$), $-C_3F_7$.

Mixtures of perfluoropolyethers with hydrofluoropolyethers can also be used.

The compounds of formula (II), (III) or their mixtures, have shown degradation values to ionizing radiations substantially similar to those of CFC 113.

The class B) fluids preferred as heat exchangers, are selected from those, liquid under environmental conditions, such for example $CF_3CF_2-CFH-CFH-CF_3$, cyclo-$C_5F_8H_3$, cyclo-$C_5F_9H_2$.

The class C) fluids preferred as heat exchangers, are hydrofluoroethers of general formula (IV):

   (IV)

wherein $R_1$, $R_2$, equal to or different from each other, comprise together at least 3 carbon atoms, and the total number of hydrogen atoms is equal at most to the number of the fluorine atoms.

Specific examples are $C_3F_7-OCH_3$, $C_4F_9-OCH_3$, $C_4F_9-O-C_2H_5$, $C_7F_{15}-O-C_2H_5$, $C_4F_9-OCF_2H$, $C_4F_9-OCF_2CF_2H$.

The preferred hydraulic fluids to be used in applications subjected to neutronic irradiation are those of class A)

having formula (I), more specifically those of formula (I) having fluorinated end groups containing at least one hydrogen atom, still more preferably those having formula (III).

The class A) perfluoropolyethers of formula (I) are known for example from U.S. Pat. No. 5,149,842, U.S. Pat. No. 5,000,830, U.S. Pat. No. 5,144,092; the class A) hydrofluoropolyethers of formula (I) are known for example from EP 695,775. The compounds of formula (I) containing —$CH_3$, —$C_2H_5$ end groups can be prepared for example by reaction of the corresponding perfluoropoly-ethers having —COF end groups with an alkaline metal fluoride (M) to give the corresponding alcoholates having —$CF_2OM$ end groups. They are reacted with methyl- or ethyl-sulphite, as described in the co-pending Italian patent application MI2001A 001340.

The class B) liquid compounds are known, for example, from U.S. Pat. No. 5,220,082, EP 982,281.

The class C) hydrofluoroethers are known for example from U.S. Pat. No. 5,713,211.

All the liquids of classes A), B) and C) have an impact on the ozone equal to zero (ODP=0). The liquids of formula (II), (III) show a resistance to ionizing radiations similar to that of CFC 113. The liquids of formula (I), for example those of formula (III), show furthermore a low potential greenhouse effect (GWP) when the $T_1$ and $T_2$ end groups contain at least one hydrogen atom.

The fluids of the invention due to their resistance to ionizing radiations do not undergo substantial variations of composition in the time. In practice in their use as liquids in cooling circuits where they are subjected to a strong ionizing radiation, they do not show substantial decreases of their cooling capability in the time.

The fluorinated fluids of the invention to be used in hydraulic circuits or as working fluids in equipments subjected to radiations with neutrons have very low neutron moderation values in comparison with those shown by the mineral oils usually employed in hydraulic working circuits. Besides it has been found that they do not undergo substantial chemical degradation.

Some Examples follow for illustrative and not limitative purposes of the present invention.

EXAMPLES

The determination of the decomposition of the liquids subjected to ionizing radiations has been carried out by the following general method.

4 g of a fluid sample were introduced, under vacuum, in quartz tubes having 5 ml volume and subsequently sealed. For each type of fluid 3 quartz tubes were prepared as above and respectively irradiated with the following increasing doses 5.2, 9.4 and 15.0 Mrad of gamma rays generated from a $^{60}CO$ source which irradiates 0.13 Mrad/h. The tubes were then opened and their liquid and vapour content was analyzed by gaschromatography and mass spectrometry.

From the liquid analysis the components not originally present in the fluid subjected to irradiation were quantified. In the same way the gaseous components different from those initially present in the fluid sample and therefore deriving from its decomposition due to the irradiation, were quantified.

The sum of the above quantified liquid and vapour components related to the used irradiation doses allows to evaluate the decomposition of the tested fluid in function of the irradiation to which it was subjected.

The obtained decomposition values (% of degraded compound) at the three different irradiation doses, once represented by a diagram, show a linear correlation with the radiation dose and the correlation coefficients $R^2$ are close to the unit.

It is therefore possible to determine the coefficient A which corelates the percentage of degraded compound to the radiation dose according to the equation:

$$\%_{degraded\ compound} = A * dose(Mrad)$$

The obtained values are reported in Table 1. Higher degradation values and irradiation doses can be extrapolated from the above reported relation.

Example 1

A perfluoropolyether sample having the structure of formula (III) wherein $T_1=T_2=$—$CF_2H$ formed for 11.8% by weight by the oligomer having d=0 and e=1 and for 88.1% by the oligomer having d=1 and e=0, with ODP=0 and GWP equal to 2,000 (100 years, referred to $CO_2$), with number average molecular weight of 228, having a boiling point of 51.5° C., viscosity at 25° C. equal to 0.37 cSt, was subjected to gamma radiations as above. A value of the coefficient A equal to 0.068 and a correlation coefficient $R^2$=0.991 were determined.

Example 2 (Comparative)

A CFC 113 sample having an ODP=0.8 and GWP equal to 5,000 (100 years, referred to $CO_2$) was subjected to gamma radiations as above. A value of A equal to 0.063 and a correlation coefficient $R^2$=0.998 were determined.

Example 3

A perfluoropolyether sample having the structure of formula (I) wherein d=0, f=0, g=0, having a number average molecular weight equal to 350 wherein the ratio (b+e)/–(a+b+e) is equal to 0.1 where $T_1$, $T_2$ are —$CF_2H$ for 5%, —$CF_2CF_2H$ for 1%, —$CF_3$ for 41%, —$C_3F_7$ for 41%, —$CF(CF_3)H$ for 12% with ODP=0, having a boiling point of 58° C., viscosity at 25° C. equal to 0.5 cSt, was subjected to gamma radiations as above. A value of the coefficient A equal to 0.068 and a correlation coefficient $R^2$ 0.953 were determined.

A similar result is obtained with the same compound having the same structure but with perfluorinated end groups.

Example 4

A commercial sample HFE 7100 by 3M having $C_4F_9OCH_3$ structure with ODP=0 and GWP equal to 500 (100 years, referred to $CO_2$), with molecular weight 250, having a boiling point of 61° C., viscosity at 25° C. equal to 0.38 cSt, was subjected to gamma radiations as above. A value of the coefficient A equal to 0.132 and a correlation coefficient $R^2$=0.991 were determined.

Example 5

A commercial sample Vertrel XF by Du Pont having $CF_3CF_2CFHCFHCF_3$ structure, with ODP=0 and GWP equal to 1,300 (100 years, referred to $CO_2$), with molecular weight 252, having a boiling point of 55° C., viscosity at 25° C. of 1.06 cSt, was subjected to gamma radiations as above. A value of the coefficient A equal to 0.107 and a correlation coefficient $R^2$=0.995 were determined.

Example 6

Two samples of a hydrofluoropolyether of formula (III) wherein $T_1$, $T_2$=—$CF_2H$ and d, e are such to have a number average molecular weight equal to 630, commercial compound Galden ZT 180 by Ausimont, were introduced in two closed polyethylene vessels.

One vessel was subjected to irradiation with neutrons for 2 hours under a neutron flow equal to $10^{12}$ neutrons/cm$^2$/sec while the other vessel was subjected to irradiation for 6 hours under a neutron flow equal to $10^{13}$ neutrons/cm$^2$/sec.

The test employing said irradiation doses is to be considered as an accelerated test since the doses really emitted by the radioactive wastes are much lower.

The former sample after irradiation did not show induced radioactivity determined by gamma spectrometry.

The latter sample after irradiation under the most severe condition was analyzed by gamma spectrometry and it did not show any induced radioactivity. Besides, it was subjected to NMR $^{19}$F and $^{1}$H analyses from which it results a molecular weight of 590, which compared with the initial MW shows that the compound is not substantially degraded.

TABLE 1

| Irradiation dose (Mrad) | Compound decomposition (% by weight) | | | | |
| --- | --- | --- | --- | --- | --- |
| | Example 1 | Example 2 (comp) | Example 3 | Example 4 | Example 5 |
| 5.2 | 0.310 | 0.320 | 0.239 | 0.633 | 0.546 |
| 9.4 | 0.643 | 0.610 | 0.622 | 1.185 | 1.050 |
| 15 | 1.043 | 0.944 | 1.078 | 2.037 | 1.578 |
| A | 0.0684 | 0.0633 | 0.0683 | 0.132 | 0.107 |
| R$^2$ | 0.991 | 0.998 | 0.953 | 0.991 | 0.995 |

What is claimed is:

1. A method comprising subjecting to ionizing radiations and/or irradiation with neutrons, the circuits or equipments containing, as heat exchange or hydraulic fluids, fluorinated compounds selected from:

A) (per) fluoropolyethers,
B) (per) fluorocarbons,
C) hydrofluoroethers,
appearing liquid under room conditions (25° C., 1 atm).

2. The method of claim 1, wherein the fluids have molecular weights comprised between 120 and 30,000, when A) is a polymer the molecular weight is a number average molecular weight.

3. The method of claim 1, wherein the class (A) (per) fluoropolyethers comprise oxyfluoroalkylene units selected from —(CF$_2$(CF$_2$)$_c$O)— wherein c=1, 2, 3; —(CF$_2$O)—; —(CF$_2$CF(CF$_3$)O)—; —(CF(CF$_3$)O)—; —(CF$_2$CF(OX)O)—; (CF(OX)O)— wherein X=—(Y)$_n$CF$_3$ wherein Y=—CF$_2$—, —CF$_2$O—, CF$_2$CF$_2$O—, —CF$_2$CF(CF$_3$)O—, and n=0, 1, 2, 3, 4; said units being statistically distributed in the polymer chain.

4. The method of claim 1, wherein the class A) compounds have structure formula (I):

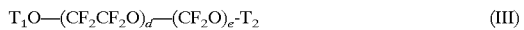

wherein X has the above meaning; the coefficients a, b, d, e, f, g are 0 or integers, c is 1, 2 or 3, selected so that their sum is such to obtain the above molecular weights; T$_1$, T$_2$ equal to or different from each other, are selected from —CF$_2$H, —CF$_2$X$_1$ (X$_1$=—F, —CF$_3$), —C$_3$F$_7$, —CF(CF$_3$)H, —CF$_2$CF$_2$H, —CH$_3$, —C$_2$H$_5$.

5. The method of claim 1, as heat exchange fluids of the liquids of formula (III)

wherein T$_1$, T$_2$=—CF$_2$H.

6. The method of claim 1, wherein the heat exchange liquids are (per) fluorocarbons.

7. The method of claim 1, wherein the liquids are hydrofluoroethers of general formula (IV):

R$_1$—O—R$_2$     (IV)

wherein R$_1$, R$_2$, equal to or different from each other, comprise together at least 3 carbon atoms, and the total number of hydrogen atoms is equal at most to the number of the fluorine atoms.

8. The method of claim 2, wherein the fluids have molecular weights between 200 and 18,000.

9. The method of claim 8, wherein the fluids have molecular weights between 300 and 6,000.

10. The method of claim 6, wherein the (per) fluorocarbons are selected from the group formed by CF$_3$CF$_2$—CFH—CF$_3$, cyclo-C$_5$F$_8$H$_3$, and cyclo-C$_5$F$_9$H$_2$.

* * * * *